United States Patent [19]

Proffitt

[11] Patent Number: 4,589,513

[45] Date of Patent: May 20, 1986

[54] ANTI-THEFT STEERING WHEEL ADAPTER DEVICE

[75] Inventor: John P. Proffitt, San Dimas, Calif.

[73] Assignee: Whittar Industries Ltd., Barrington, Ill.

[21] Appl. No.: 713,952

[22] Filed: Mar. 20, 1985

[51] Int. Cl.[4] .............................................. B60R 25/02
[52] U.S. Cl. ..................................... 180/287; 70/252; 74/484 R; 180/78
[58] Field of Search ......................... 180/78, 271, 287; 70/252; 71/484 R

[56] References Cited

U.S. PATENT DOCUMENTS

| | | | |
|---|---|---|---|
| 1,381,000 | 6/1921 | Mueller | 70/252 |
| 1,661,447 | 3/1928 | Seng | 70/252 |
| 3,078,945 | 2/1963 | Frey | 180/271 |
| 3,078,946 | 2/1963 | Young, Jr. | 180/271 |
| 3,553,986 | 1/1971 | Ball et al. | 180/287 |
| 3,773,137 | 11/1973 | Escudero | 180/271 |
| 3,796,112 | 3/1974 | Hoffman | 74/493 |
| 4,258,560 | 3/1981 | Jessop | 180/287 |
| 4,397,167 | 8/1983 | Maiocco | 70/252 |

Primary Examiner—John J. Love
Assistant Examiner—Kenneth R. Rice
Attorney, Agent, or Firm—Donald E. Nist

[57] ABSTRACT

The device includes an open topped housing, the bottom of which is interconnectable to a vehicle steering column through an adapter plate. A biasing plate is slideably supported in a horizontal position in the housing on a number of spaced vertical posts secured to a base plate in the housing. The biasing plate bears a number of spaced ridges extending up from the periphery thereof and defining peripheral recesses therebetween. A horizontal ring locking plate is fixed to the top of the posts above the biasing plate and bears spaced teeth defining a number of notches therebetween with the teeth partially overlying the biasing plate ridges. Coiled springs on the posts push up the locking plate. A lever secured to the biasing plate is needed to selectively move that plate down from the locking plate. A keylock in the housing extends out therefrom and releasably locks the biasing plate up against the locking plate. The device also includes an inverted cup-shaped steering wheel hub connector cap which has on its underside a central plate bearing peripheral projections matching the notches in the locking plate. The connector cap can be pressed down through the locking plate to depress the biasing plate sufficiently to permit rotation of the steering wheel and cap plate to positively lock the projections in the biasing plate recesses below the locking plate teeth.

7 Claims, 8 Drawing Figures

ANTI-THEFT STEERING WHEEL ADAPTER DEVICE

BACKGROUND OF THE INVENTION

1. Field of the Invention

The present invention generally relates to wheels and more particularly to an improved type of adapter device which is connectable to a vehicle steering wheel column and to a steering wheel to prevent theft of the steering wheel.

2. Prior Art

Various types of devices have been devised for releasably connecting steering wheels to vehicle wheel steering columns. See, for example, U.S. Pat. No. 3,796,112. See also U.S. Pat. Nos. 3,773,137, 3,078,946, 3,078,945, 1,661,447 and 1,381,000. In some instances, the wheel-connecting devices are relatively complicated and in most cases when the wheel can be separated at will from the steering column such devices are unsafe. Most such devices in any event do not prevent the wheel from being easily stolen from a vehicle, as for example, merely by removing the horn cover from the wheel hub and disconnecting a few bolts or the like. Moreover, most such devices do not protect the steering column from tampering when the steering wheel has been removed, so that it is possible for the vehicle owner to remove the steering wheel as a protective measure and still have the vehicle subsequently stolen by one who enters the vehicle and attaches another steering wheel to the steering column in order to drive the vehicle away.

Accordingly, there remains a need for an improved steering wheel adapter device which is capable of positively locking a steering wheel to a vehicle steering wheel column in a totally safe and simple manner in order to prevent accidental loosening of the wheel from the column during use. Such device should also readily permit the unlocking and removal of the steering wheel for substitution of another wheel or for removal from the vehicle to prevent its loss by theft. The device should also positively prevent the wheel from being stolen while attached to the steering column. Furthermore, the device should prevent the substitution by a vehicle thief of another wheel for the removed wheel, in order to be able to drive the vehicle away.

SUMMARY OF THE INVENTION

The improved anti-theft steering wheel adapter device of the present invention satisfies all the foregoing needs. The device is substantially as set forth in the Abstract above. Thus, the device includes an open topped housing connectible through an adapter plate or the like to a vehicle steering column, and an inverted cup-shaped steering wheel connector cap securable to the bottom of the hub of a steering wheel and lockable to the housing to form a sealed container therewith.

The housing includes a biasing plate slideably supported on spaced vertical posts and biased by springs attached to the posts up against the underside of a ring locking plate fixed to the top of the posts. A lever is secured to the biasing plate and extends out of the housing to permit the biasing plate to be moved down against the spring biasing force when it is desired to unlock the device.

A keylock in the housing extends outwardly therefrom and is adapted to lock the biasing plate up against the locking plate. A series of alternating recesses and ridges are spaced about the periphery of the biasing plate. A series of alternating teeth and notches are spaced peripherally around the ring locking plate. A cap plate bearing spaced peripheral projections is attached to the underside of the connector cap.

When the connector cap is fitted down over the top of the housing, its plate passes down through the locking plate and pushes the biasing plate down sufficiently to permit rotation of the wheel and cap plate so that the projections seat into the biasing plate recesses and are trapped therein by the locking plate teeth overlying those recesses and by the spring biased biasing plate. The wheel is thereupon positively locked and cannot be removed from the steering column until the level is depressed (with the keylock unlocked) which then permits rotation of the wheel and then lifting it and the cap plate up through the locking plate.

Accordingly, the device has a fail safe positive locking system built into it so that the steering wheel cannot become inadvertently detached from the steering column, once the connector cap plate is properly seated in the housing, even if the lock is in the unlocked position, so long as the lever is not depressed. The wheel can be locked by the keylock to prevent any operation of the lever.

The wheel can be very rapidly disconnected from the steering column merely by unlocking the lock, depressing the lever, rotating the wheel and lifting it up from the container. When the wheel has been removed from the column, a blank-off cap substantially identical to the connector cap and containing a cap plate can be substituted for the connector cap and attached and locked to the housing to seal the steering column against tampering, substitution of another wheel, etc.

Further features of the invention are set forth in the following detailed description and accompanying drawings.

DRAWINGS

DETAILED DESCRIPTION

FIGS. 1-7

Figure 1:
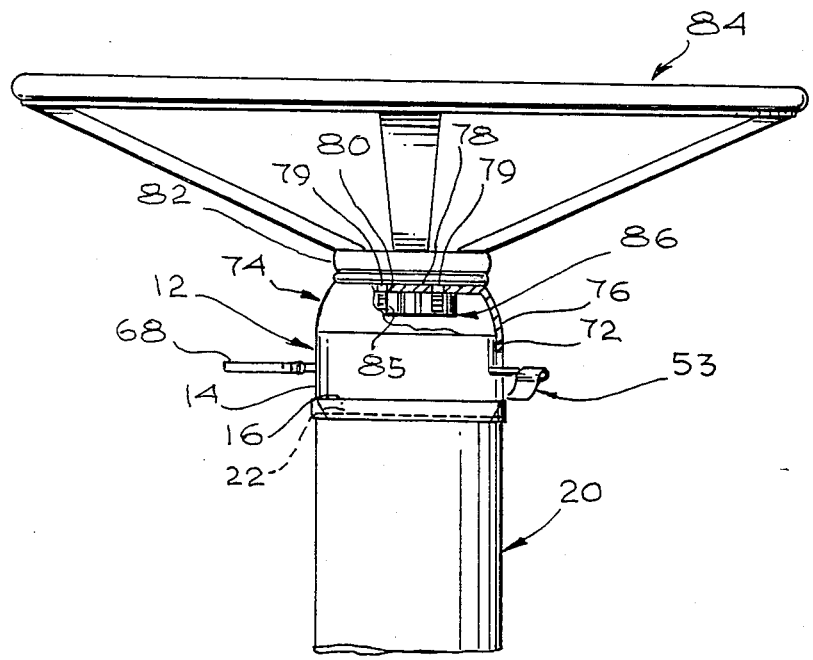
FIG. 1 is a schematic side elevation, partly broken away and partly in section, of a preferred embodiment of the improved anti-theft steering wheel adapter device of the present invention.

Now referring more particularly to the accompanying drawings, FIG. 1 is a schematic side elevation, partly broken away, depicting a preferred embodiment of the improved anti-theft adapter device of the present invention, interconnecting a vehicle wheel and a vehicle steering column. Thus, device 10 is shown which comprises, in combination, a cup-shaped housing 12 which preferally is generally cylindrical and has vertical sidewalls 14 connected to a horizontal bottom 16, the latter containing a plurality of apertures 18 through which bolts (not shown) or other connector means may be used to attach housing 12 directly to a steering column 20 or to an adapter plate 22 which is in turn secured to steering column 20 as indicated in FIG. 1.

Figure 5:
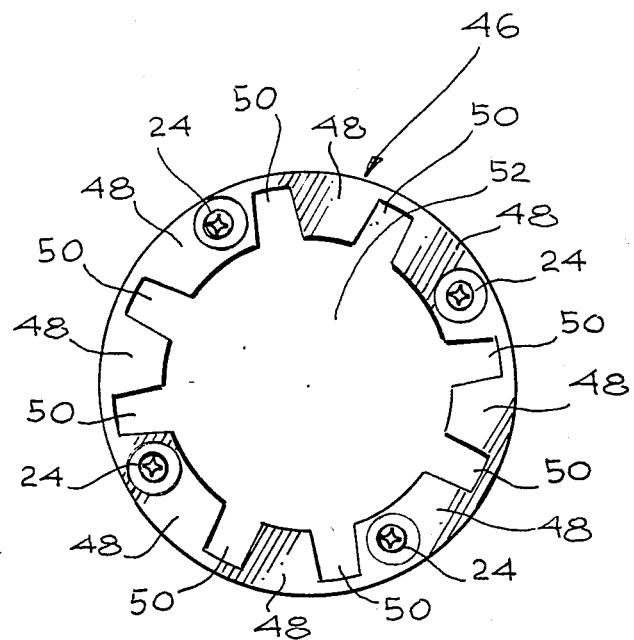
FIG. 5 is a schematic top plan view of the locking plate used in the housing of FIG. 1.
Figure 7:
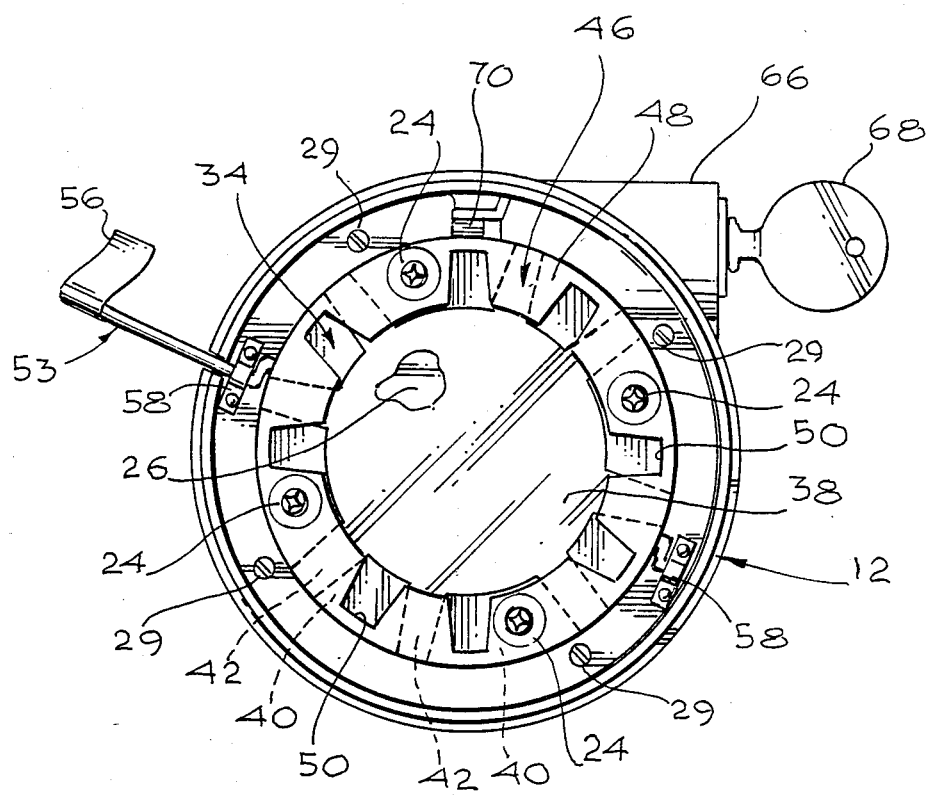
FIG. 7 is a schematic top plan view, partly broken away, of the locking plate, biasing plate, vertical posts, base plate and lever disposed in the housing of FIG. 1; and, FIG. 8 is a schematic side elevation, partly broken away and partly in section, of the housing and components therein of the device of FIG. 1.
Figure 8:
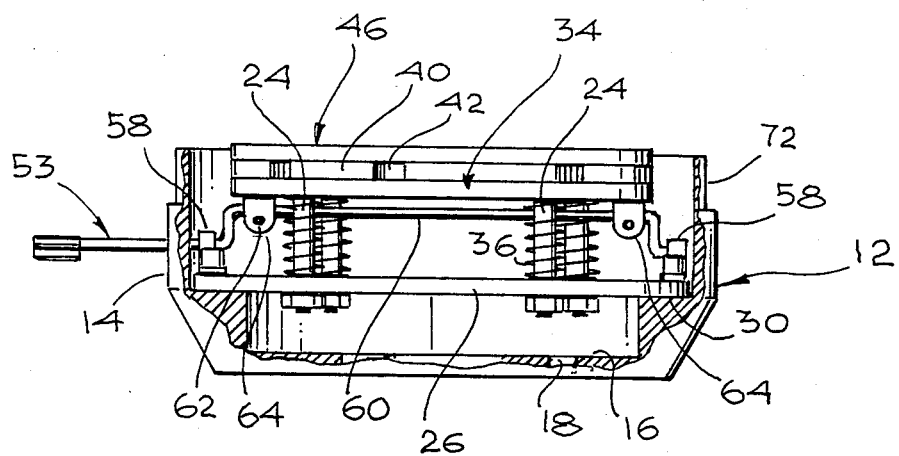

A plurality, in this instance 4, vertical posts 24, (FIGS. 5, 7 and 8) are spaced in housing 12 and preferably connected to a horizontal base plate 26 (FIG. 3) as by screws or the like (not shown) insertable through apertures 27 in plate 26. Plate 26 may be releasably connected by screws 29 or the like (FIG. 7) through apertures 28 to bottom 16 of housing 12. As shown in FIG. 8, plate 26 is secured to shelf 30 of bottom 6 through apertures 32 (FIG. 2) therein.

Figure 4:
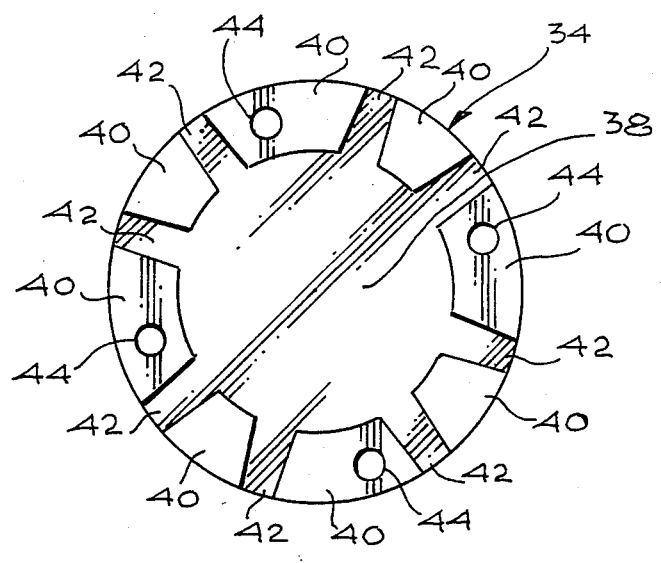
FIG. 4 is a schematic top plan view of the biasing plate utilized in the housing of FIG. 1.

Posts 24 have a horizontal biasing plate 34 slideably secured thereon and biased upwardly by coiled springs 36 secured around posts 24. Biasing plate 34 has on its upper surface 38 (FIG. 4) a plurality of spaced raised ridges 40 disposed at the outer periphery thereof, plate 34 being flat and cylindrical. Ridges 40 are of unequal width and are generally wedge-shaped and define therebetween a plurality of recesses 42. Apertures 44 extend up through plate 34 to receive posts 24 to the top of which is fixedly secured a ring-shaped locking plate 46 (Fig.). Plate 46 has a plurality of teeth 48 spaced along the inner periphery thereof and defining therebetween a plurality of peripheral notches 50. Plate 46 defines a central aperture 52. Springs 36 bias plate 34 up against plate 46, and plates 34 and 46 are oriented relative to each other as shown in FIG. 7. In this regard, teeth 48 partially overlie each of recesses 42 while notches 50 partially overlie each of ridges 40.

Figure 3:
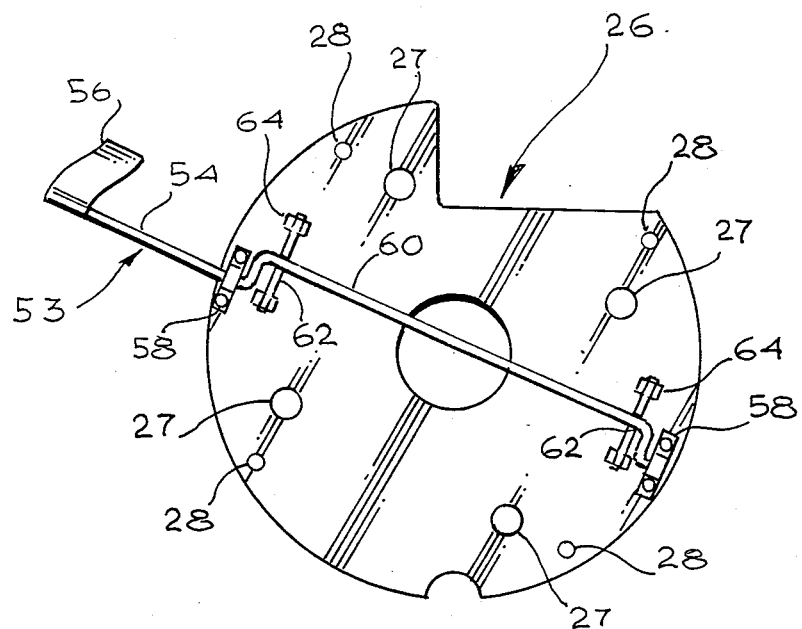
FIG. 3 is a schematic top plan view of the base plate used in the housing of FIG. 1, together with the lever used therein.

As seen particularly in FIGS. 3, 7 and 8, plate 26 bears a lever 53 which comprises an elongated rod 54 fitted with a handle 56 outside housing 12. Rod 54 extends through housing 12 between a pair of brackets 58 disposed on opposite sides of the top surface of plate 26. Rod 54 has a U-shaped central portion 60 which bears against the horizontal crossbars 62 of a pair of U-shaped brackets 64 secured to and depending from the underside of plate 34 so that in the resting position plate 34 is biased upwardly against the underside of plate 46. However, when it is desired to move plate 34 down away from plate 46, rotation of handle 56 causes the angled central portion of rod 60 to force downwardly against crossbars 62 and thus move plate 34 down against the biasing force of springs 36.

Figure 2:
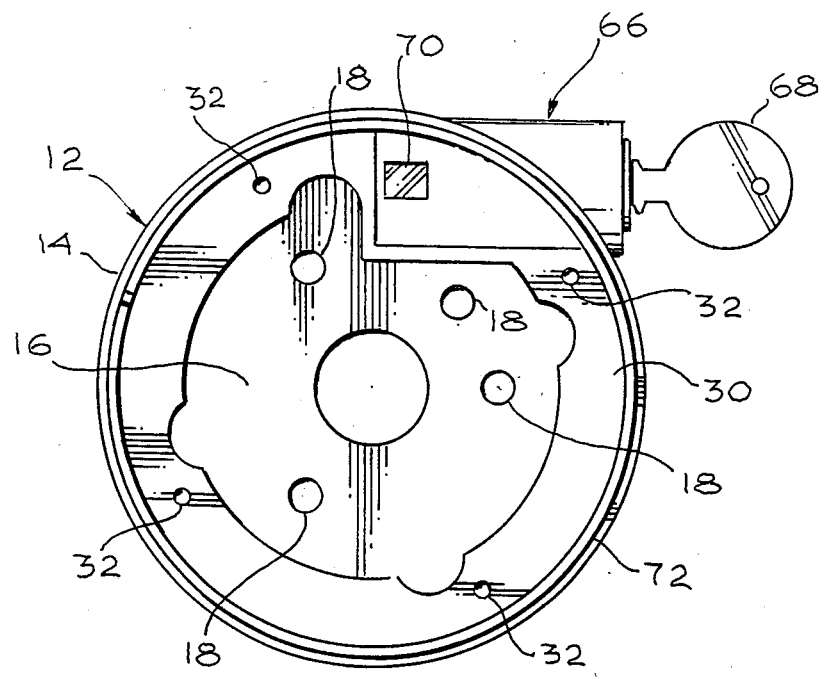
FIG. 2 is a schematic top plan view of the housing of FIG. 1.

As shown particularly in FIGS. 2 and 7, housing 12 is also provided with a lock 66 operated by a key 68 which extends out of housing 12 and is removable therefrom. Lock 66 has a lever arm 70 which in the locked position is up against the resting biased position of plate 34, and prevents plate 34 from being moved downwardly away from plate 46 by lever 53. In the unlocked position, lock 66 has lever arm 70 retracted to permit downward movement of plate 34 by lever 52.

Figure 6:
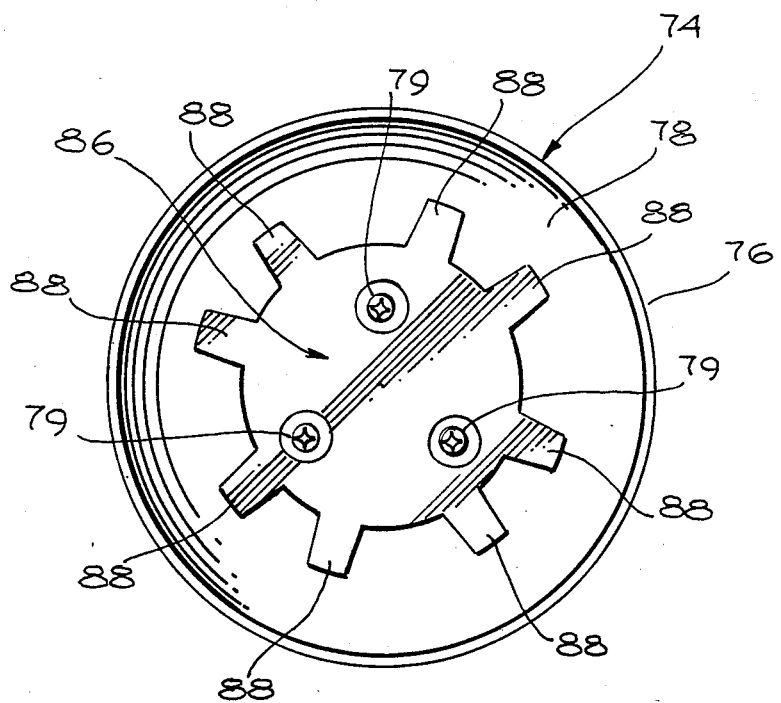
FIG. 6 is a schematic bottom plan view of the connector cap used in FIG. 1.

Housing 12 has a recessed upper outer edge 72 which permits an inverted cup-shaped connector cap 74 (FIG. 1) to be placed down thereover and be seated against recessed portion 72. Connector cap 74 comprises depending sidewalls 76 integrally connected to horizontal top 78. Top 78 is securable by bolts 79, screws or the like (FIGS. 1 and 6), through apertures 80 therein to the underside of central wheel hub 82 of steering wheel 84 (FIG. 1).

Connector 74 has secured to underside of top 78 a cap plate 86 (FIG. 6), as by bolts 79 extending through apertures 85 (FIG. 1) which are aligned with apertures 80. Plate 86 is generally flat and circular in outline and bears a plurality of spaced radially outwardly extending projections 88 which match in number, shape, size and location notches 50 in ring plate. In other words, plate 86 is dimensioned to pass down through ring plate 46 during fitting of connector cap 74 over the top of housing 12. Thus, when it is desired to connect wheel 84 bearing cap 74 to steering column 20 bearing housing 12, cap 74 is passed down over the top of housing 12 in a manner such that plate 86 passes down through plate 46 and depresses biasing plate 34 sufficiently so that wheel 84 and connected cap 74 can be partially rotated to cause projections 88 to seat within recesses 42. Guide marks (not shown) may be provided on the exterior of cap 74 and housing 12 to facilitate their initial alignment and subsequent rotation of cap 74 into the seated position. In the seated position wheel 84 is locked to column 20. In this regard, plate 34 is spring biased up against the underside of projections 88 and traps projections 88 in recesses 42 below teeth 48. Projections 88 cannot be rotated out of recesses 42 until lever 52 is rotated to depress plate 34 sufficiently to permit such rotation and unlocking of wheel 84 from column 20. This fail safe feature prevents inadvertent separation of wheel 84 from column 20. Lock 66 then can be locked to force lever 70 up against the underside of plate 34 so that it cannot be depressed by lever 53 and thus unlocked. Key 68 can then be withdrawn.

Accordingly, device 10 positively locks wheel 84 to column 20 even without using lock 66. However, lock 66 is employed to prevent inadvertent operation of lever 52 and subsequent unlocking. The placing of wheel 84 on column 20 and, in effect, double locking it in place can be carried out in a few seconds. Similarly, the unlocking and removal of wheel 84 from column 20 takes only a few seconds. When wheel 84 is removed from column 20, a blank-off plate (not shown) identical to plate 86 can be inserted on housing 12 and locked thereto in the manner described for plate 86. This seals off housing 12 to prevent tampering therewith and substitution by a would-be vehicle thief of another steering wheel for the removed steering wheel, which substitution would then enable the thief to drive the vehicle away.

Device 10 can be fabricated of durable, inexpensive tamperproof components, such as hardened steel and the like and can be provided in a variety of shapes and sizes to match various steering wheels and steering columns. Device 10 is simple, effective and safe, providing positive locking in a fail-safe manner of a steering wheel to a steering wheel column while also permitting rapid removal of the wheel by the operator. Various other features of the present invention are set forth in the foregoing.

Various modifications, changes, alterations and additions can be made in the improved anti-theft steering wheel adapter device of the present invention, its components and their parameters. All such modifications, changes, alterations and additions as are within the scope of the appended claims form part of the present invention.

What is claimed is:

1. An improved adapter device for preventing theft of steering wheels while rendering them removable, said device comprising, in combination:
   a. an open topped housing having upraised sides connected to a transverse bottom, said bottom being interconnectable to a vehicle steering column;
   b. a biasing plate slideably supported in a horizontal position on a plurality of spaced vertical posts secured in said housing, said biasing plate bearing on the upper surface thereof a plurality of spaced ridges extending upwardly therefrom and arranged at the periphery thereof to define peripheral recesses therebetween;
   c. a horizontal ring locking plate fixedly secured to said posts above said biasing plate and bearing spaced teeth defining therebetween a plurality of notches extending vertically therethrough, said teeth partially overlying said recesses and said notches partially overlying said ridges;
   d. spring biasing means biasing said biasing plate up against said locking plate;
   e. a lever secured to said biasing plate and extending outwardly from said housing for selectively moving said biasing plate downwardly away from said locking plate against said biasing means;
   f. a keylock in said housing and extending outwardly therefrom and including means for releasably locking said biasing plate up against said locking plate; and,
   g. an inverted cup-shaped steering wheel connector cap securable to the hub of a steering wheel, and bearing on the underside thereof a central cap plate having peripheral projections matching said notches so that said connector cap can be pressed down through said locking plate to depress said biasing plate sufficiently to permit partial rotation of said cap plate in order to place said projections in said recesses and trap them therein below said teeth, said biasing means preventing the removal of said projections from said recesses until said lever means is rotated to depress said biasing plate when said lock is in the unlocked position.

2. The improved device of claim 1 wherein said housing bottom bears apertures to permit connection of said housing to an adapter plate securable to the top of a vehicle steering column.

3. The improved device of claim 2 wherein said biasing plate is generally cylindrical and said recesses and ridges are disposed in a ring at the outer periphery thereof.

4. The improved device of claim 3 wherein said cap plate is generally cylindrical with said peripheral projections extending radially outwardly therefrom.

5. The improved device of claim 4 wherein said housing and said connector cap are generally cylindrical and wherein said connector cap is adapted to fit down over the upper portion of said housing to form a closed container therewith.

6. The improved device of claim 1 wherein said device includes a separate blank off cap substantially identical to said connector cap but unattachable to a steering wheel, whereby upon removal of a steering wheel bearing said connector cap from said housing, said blank-off cap is securable to said housing in place of said connector cap to prevent unauthorized access to components of said device within said housing.

7. The improved device of claim 6 wherein said posts are secured at the lower ends thereof to a horizontal base plate releasably secured in the bottom of said housing.

* * * * *